(12) United States Patent
Hecht

(10) Patent No.: US 9,103,418 B2
(45) Date of Patent: Aug. 11, 2015

(54) MACHINE TOOL ASSEMBLY FOR MACHINING WORKPIECES AND ACTUATOR COMPONENT THEREOF

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 219 days.

(21) Appl. No.: 13/932,820

(22) Filed: Jul. 1, 2013

(65) Prior Publication Data

US 2015/0000434 A1    Jan. 1, 2015

(51) Int. Cl.
*B23B 27/16* (2006.01)
*F16H 25/14* (2006.01)
*B23B 29/04* (2006.01)
*F16B 35/00* (2006.01)
*B23B 27/00* (2006.01)

(52) U.S. Cl.
CPC ............ *F16H 25/14* (2013.01); *B23B 27/1622* (2013.01); *B23B 29/043* (2013.01); *F16B 35/005* (2013.01); *B23B 2205/045* (2013.01); *Y10T 74/18296* (2015.01)

(58) Field of Classification Search
CPC  B23B 27/16; B23B 27/1614; B23B 27/1662; B23B 2205/04; B23B 2205/00
See application file for complete search history.

(56) References Cited

U.S. PATENT DOCUMENTS

| | | | | |
|---|---|---|---|---|
| 3,341,921 A | * | 9/1967 | Weller et al. | 407/104 |
| 3,946,473 A | * | 3/1976 | Petersen | 407/105 |
| 6,379,087 B1 | * | 4/2002 | Alexander, IV | 407/107 |
| 6,599,060 B2 | * | 7/2003 | Hecht | 407/102 |
| 2010/0104384 A1 | * | 4/2010 | Orlov et al. | 407/41 |
| 2012/0099935 A1 | * | 4/2012 | Hecht | 407/100 |
| 2013/0156516 A1 | * | 6/2013 | Hecht | 407/103 |

FOREIGN PATENT DOCUMENTS

| | | |
|---|---|---|
| DE | 3019970 A1 | 12/1981 |
| DE | 202006009048 U1 | 10/2006 |
| EP | 0161506 A1 | 11/1985 |
| GB | 964725 | 7/1964 |

OTHER PUBLICATIONS

Search report dated Sep. 24, 2014 issued in PCT counterpart application (No. PCT/IL2014/050521).

* cited by examiner

*Primary Examiner* — Will Fridie, Jr.
(74) *Attorney, Agent, or Firm* — Womble Carlyle

(57) ABSTRACT

A machine tool assembly includes a basic body, and a clamp and an actuator component mounted to the basic body. The clamp and actuator components include ramping surfaces for cooperatively biasing the clamp into an engagement position. The actuator component is configured to move along an actuator movement axis and includes an actuator relief surface connected, and extending at a different angle, to the actuator component's ramping surface. The different angle is configured to facilitate disengagement of the actuator component and clamp for a smaller movement of the actuator component along the actuator movement axis than would have been the case in the absence of such configuration, thereby allowing a compact construction of the assembly.

20 Claims, 4 Drawing Sheets

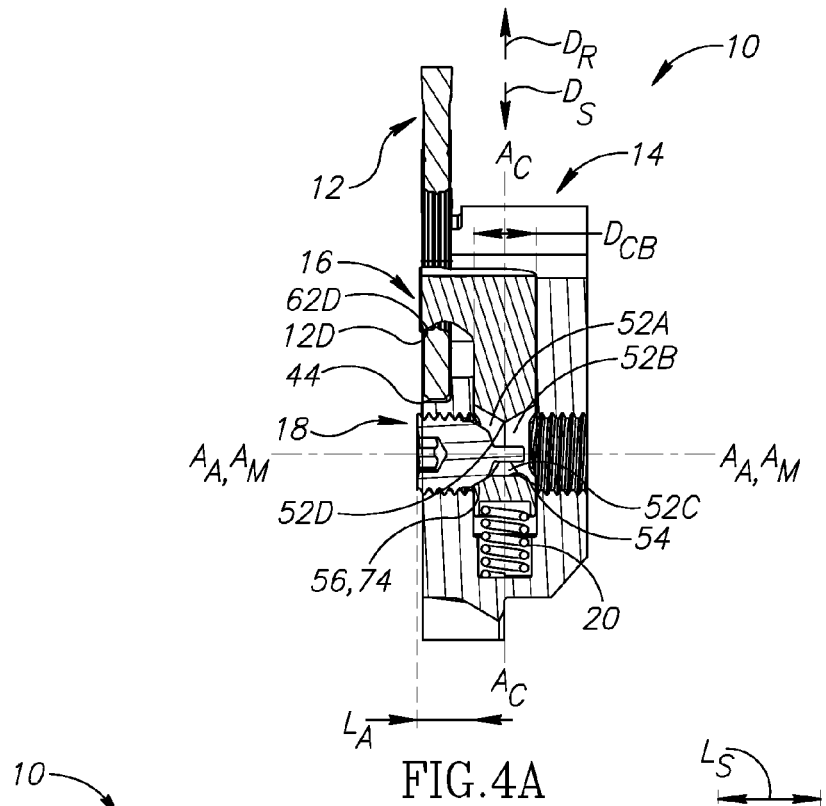
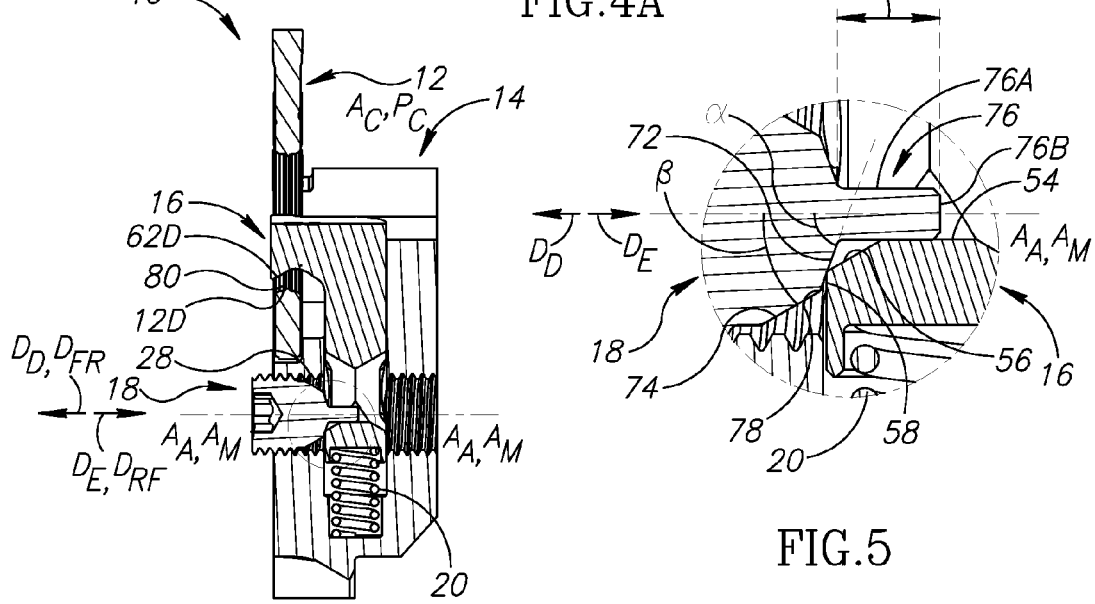

MACHINE TOOL ASSEMBLY FOR MACHINING WORKPIECES AND ACTUATOR COMPONENT THEREOF

FIELD OF THE INVENTION

The subject matter of the present application relates to a machine tool assembly configured for machining work pieces, and comprising an actuator component for bringing a clamp of the assembly to different positions. More particularly, the machine tool assembly can be a turning tool configured for machining a rotating workpiece via a cutting insert clamped to a basic body of the assembly.

BACKGROUND OF THE INVENTION

Example machine tool assemblies with actuator components configured for causing a clamp to hold a cutting insert to a basic body are disclosed in U.S. Pat. No. 6,599,060 and GB 964,725.

SUMMARY OF THE INVENTION

The subject matter of the present application relates to providing a machine tool assembly which can have a compact construction.

More precisely, in accordance with a first aspect of the subject matter of the present application, there is provided an actuator component, or machine tool assembly comprising same.

The actuator component comprises an actuator ramping surface and an actuator relief surface extending in a different direction thereto. The actuator relief surface is outwardly slanted relative to a rearward disengagement direction or front-to-rear direction, to form an acute internal relief angle $\alpha$ with an actuator axis or actuator movement axis; and the actuator ramping surface is outwardly slanted relative to the rearward disengagement direction or the front-to-rear direction to form an acute internal engagement angle $\beta$ with the actuator axis or actuator movement axis, and is smaller than the relief angle $\alpha$.

As will be understood from the description hereinbelow, an actuator ramping surface extending in a different direction to an actuator relief surface can facilitate disengagement of an actuator component and a clamp for a relatively small movement of the actuator component along an actuator movement axis, thereby facilitating the above-mentioned compact construction. In addition to enabling compactness, such assembly can provide an effective solution with only a small number of components (e.g. three or four elements in total, i.e. basic body, clamp, actuator component and an optional biasing element). Such compact and simple design can be particularly useful for very small tools, especially for reducing the likelihood of elements falling from the assembly during assembly steps.

In accordance with another aspect of the subject matter of the present application, there is provided a machine tool assembly comprising: a basic body having a clamping axis and an actuator movement axis, and comprising an insert holding arrangement, the actuator movement axis defining a forward engagement direction and a rearward disengagement direction; a clamp mounted to the basic body, configured to move along the clamping axis relative to the basic body, and comprising a clamp ramping surface and a clamping surface; and an actuator component mounted to the basic body and configured to move along the actuator movement axis; the actuator component comprising a rear first portion and a front second portion; the front second portion being closer than the rear first portion to the clamp ramping surface and comprising: an actuator relief surface which is outwardly slanted relative to the rearward disengagement direction to thereby form an acute internal relief angle $\alpha$ with the actuator movement axis; and an actuator ramping surface connected at a discontinuity to the actuator relief surface and outwardly slanted relative to the rearward disengagement direction to thereby form an acute internal ramping angle $\beta$ with the actuator movement axis, the ramping angle $\beta$ being smaller than the relief angle $\alpha$; wherein the machine tool assembly is adjustable between: an engagement position in which the actuator ramping surface abuts the clamp ramping surface, thereby biasing the clamp's clamping surface towards the insert holding arrangement; and a disengagement position in which the actuator relief surface is located closer than the actuator ramping surface to the clamp ramping surface.

In accordance with yet another aspect of the subject matter of the present application, there is provided an actuator component having an actuator axis defining a front-to-rear direction, and comprising: a rear first portion comprising a peripheral actuator threading configured to move the actuator component in the front-to-rear direction, and a coupling arrangement for rotating the actuator component thereby; and a front second portion comprising: an actuator relief surface which is outwardly slanted relative to the front-to-rear direction to thereby form an acute internal relief angle $\alpha$ with the actuator axis, and fulfilling the condition $\alpha<82°$; and an actuator ramping surface located closer to the rear first portion than the actuator relief surface, connected at a discontinuity to the actuator relief surface, and outwardly slanted relative to the rearward disengagement direction to thereby form an acute internal ramping angle $\beta$ with the actuator axis, the second acute internal ramping angle $\beta$ being smaller than the first internal relief angle $\alpha$ and fulfilling the condition $5°\leq\beta\leq(\alpha-5°)$.

It will be understood that the above-said is a summary, and that any of the aspects above may further comprise any of the features described hereinbelow. Specifically, the following features, either alone or in combination, may be applicable to any of the above aspects:

A. A basic body can comprise an insert holding arrangement.
B. A basic body can be formed with a clamp bore. The clamp bore can be formed in a front surface of the basic body. The clamp bore and/or a clamping axis thereof can be slanted relative to a longitudinal body axis of the basic body.
C. A clamp can be mounted to a basic body. More precisely, the clamp can be mounted to a clamp bore formed in the basic body.
D. A clamp can be formed with a clamp through-hole.
E. A clamp can comprise a clamp ramping surface. A clamp ramping surface can be an internal peripheral surface of a clamp through-hole.
F. A clamp can comprise clamping teeth. More precisely, the clamp can comprise a clamping surface which comprises the clamping teeth. The clamping teeth can be configured to clamp a cutting insert.
G. A clamp can have a unitary monolithic construction.
H. A clamp can be configured to move along a clamping axis.
I. A basic body can be formed with an actuator bore. The actuator bore can be threaded. The actuator bore can open out to a single side surface of the basic body or to two different side surfaces of the basic body. The actuator bore can be formed in a side surface of the basic body. The actuator bore can be configured to receive an actuator component on either side of a clamp. The actuator bore and/or an actuator movement axis can be perpendicular to a clamping axis of the basic body.

J. An actuator component can be mounted to a basic body. More precisely, the actuator component can be mounted to an actuator bore.

K. An actuator component can be configured to move along an actuator movement axis. An actuator component can be formed with a threading located along the periphery thereof for moving it along the actuator movement axis or in a direction along an actuator axis.

L. An actuator component can be configured to move along an actuator movement axis in an engagement direction from a disengagement position to an engagement position.

M. An actuator component can be configured to move along an actuator movement axis in a disengagement direction from an engagement position to a disengagement position.

N. An engagement direction can be defined along an actuator movement axis from a rear first portion to a front second portion of an actuator component.

O. An engagement direction can be in an opposite direction to a disengagement direction.

P. An actuator component can comprise a rear first portion.

Q. A rear first portion can comprise a peripheral actuator threading configured to moving the actuator component along an actuator movement axis. More precisely, to move the actuator component in a front-to-rear direction and/or in a rear-to-front direction.

R. A rear first portion can have a cylindrical shape.

S. An actuator component can comprise a front second portion.

T. A rear first portion can be integrally formed with the front second portion to have one-piece unitary construction therewith.

U. A front second portion can be adjacent to a rear first portion.

V. An actuator relief surface and/or an actuator ramping surface can be frustoconically shaped. Stated differently, an actuator relief surface and an actuator ramping surface can each be formed on a frustoconical portion of the actuator component.

W. An actuator ramping surface extends in a different direction to an actuator relief surface.

X. An actuator ramping surface is connected to an actuator relief surface at a discontinuity. More precisely, there can be a single discontinuity only. Stated differently, in a side view, the actuator ramping surface and actuator relief surface can each extend at a specific angle (i.e. and not curve from that extending direction or have further discontinuities formed therein).

Y. An actuator ramping surface can be located further from an actuator movement axis or actuator axis, and closer to a rear first portion, than an actuator relief surface.

Z. An actuator ramping surface can have, in a side view, a length of at least 0.5 mm actuator ramping surface.

AA. An actuator component can comprise an actuator stopper located, in a forward engagement direction, further along an actuator movement axis than an actuator relief surface. An actuator stopper can be arranged along the actuator axis closer to the actuator relief surface than to the actuator ramping surface. A front second portion of an actuator component can comprise the actuator stopper.

BB. An actuator stopper can have a generally cylindrical shape.

CC. An actuator stopper can extend parallel to an actuator movement axis.

DD. An actuator stopper can have an actuator stopper length parallel to an actuator movement axis, and an actuator threading can have an actuator threading length parallel with the actuator movement axis, and the actuator stopper length can be equal to or less than the actuator threading length.

EE. An actuator relief surface can be slanted toward a disengagement direction to form an acute internal relief angle α with an actuator movement axis. More precisely, the actuator relief surface can be slanted toward the disengagement direction to form an internal relief angle α with the actuator movement axis fulfilling the condition α≤82°.

FF. An actuator ramping surface is slanted toward a disengagement direction to form an acute internal engagement angle β with an actuator movement axis which is smaller than a relief angle α. More precisely, the actuator ramping surface can be slanted toward the disengagement direction to form an internal engagement angle β with the actuator movement axis fulfilling the condition 5°≤β≤(α−5°).

GG. In an engagement position, an actuator ramping surface can abut a clamp ramping surface thereby biasing a clamping surface towards an insert holding arrangement.

HH. In a disengagement position, an actuator relief surface can be located closer than an actuator ramping surface to a clamp ramping surface.

II. In a disengagement position, a clamping surface and insert holding arrangement are either spaced further apart from each other, or are free to be spaced further apart from each other, than in an engagement position.

JJ. An actuator component can comprise a coupling arrangement for rotation thereof. The coupling arrangement can be a tool receiving recess. The coupling arrangement can be coaxially located with an actuator movement axis. The coupling arrangement can be formed with a rear first portion of the actuator component.

KK. An assembly can comprise a spring configured to bias a clamp. The spring can be configured to bias the clamp to a disengagement position. The spring can be configured to bias a clamp to be spaced away from an insert holding arrangement.

LL. An actuator movement axis and an actuator axis can be coaxial. A front-to-rear direction can be identical to a rearward disengagement direction, and a rear-to-front direction can be identical to a forward engagement direction.

BRIEF DESCRIPTION OF THE DRAWINGS

For a better understanding of the subject matter of the present application, and to show how the same may be carried out in practice, reference will now be made to the accompanying drawings, in which:

FIG. 4A is a cross section view taken along line 4A-4A in FIG. 1B, and shows the assembly in an engagement position;

FIG. 4B is a similar cross section view to FIG. 4A, except showing the assembly in a disengagement position; and FIG. 5 is an enlarged portion of FIG. 4B.

DETAILED DESCRIPTION

Figure 1A:
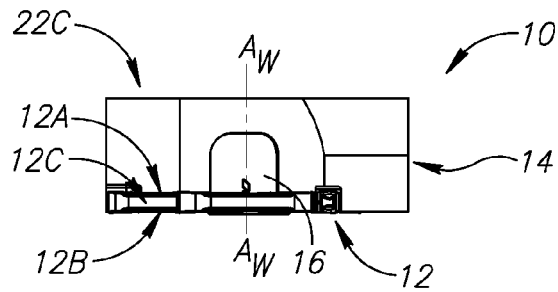
FIG. 1A is a front view of a machine tool assembly and cutting insert.
Figures 1B, 1C, 1D:
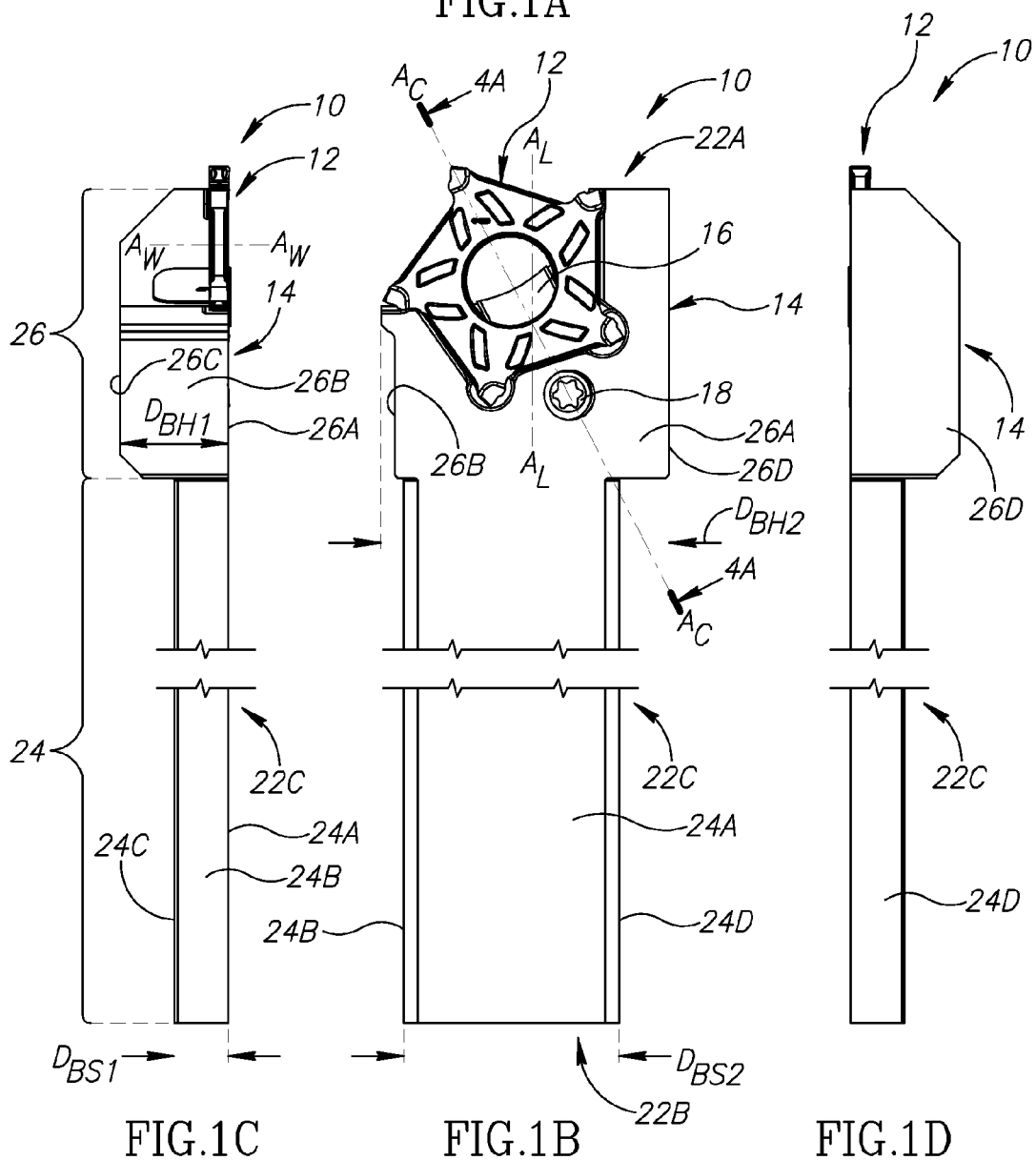
FIG. 1B is a side view of the machine tool assembly and cutting insert in FIG. 1A.
FIG. 1C is a plan view of the machine tool assembly and cutting insert in FIGS. 1A and 1B.
FIG. 1D is a bottom view of the machine tool assembly and cutting insert in FIGS. 1A to 1C.
Figure 2:
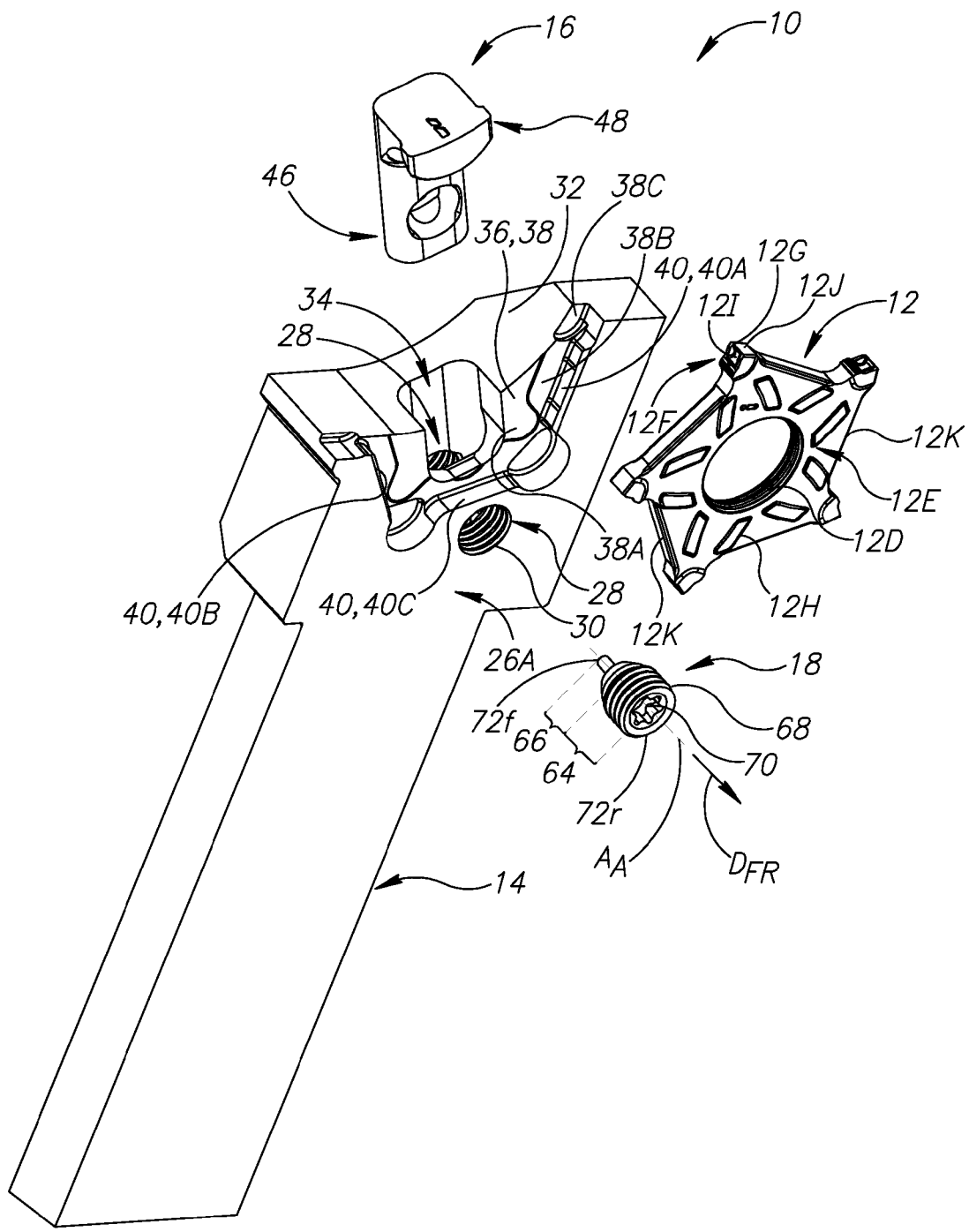
FIG. 2 is an exploded view of the machine tool assembly and cutting insert in FIG. 1.

Reference is made to FIGS. 1A to 2, in which a machine tool assembly 10 configured for holding a cutting insert 12 is illustrated.

The assembly 10 comprises a basic body 14, a clamp 16, an actuator component 18, and can comprise a spring 20 (FIG. 4A).

The cutting insert 12 can be made of extremely hard and wear-resistant material such as cemented carbide, either by form-pressing and then sintering carbide powders in a binder or by powder injection molding methods. The assembly 10, and particularly the actuator component 18 thereof, may have particular benefits for a cutting insert 12 sold by the present Applicant under the trade name "PENTA IQ GRIP"™. For example, referring to FIG. 1A, the cutting insert 12 can comprise parallel insert first and second sides 12A, 12B connected by an insert peripheral surface 12C which extends peripherally around the cutting insert 12. Referring also to FIG. 2, the cutting insert 12 can also comprise a clamping hole 12D which is a through-hole which opens out to both of the insert first and second sides 12A, 12B. The shape of the cutting insert 12 can comprise a generally disc-shaped body portion 12E and cutting portions 12F which can be circumferentially spaced along a periphery of the body portion 12E. Each cutting portion 12F comprises a cutting edge 12G. Preferably, there can be exactly five, equally circumferentially spaced, cutting edges 12G. This can allow an advantageous increased depth of cut (when compared to other numbers of cutting edges). Each cutting edge 12G can be considered a "fully effective" cutting edge. Formed at the insert first and second sides 12A, 12B there can be a plurality of side seating surfaces 12H. A width axis $A_W$ (FIG. 1A) is defined parallel to a smallest dimension of a portion of the basic body 14 which holds the actuator component 18. The width axis $A_W$ can be perpendicular to the insert first and second sides 12A, 12B and can extend through the middle of the cutting insert 12, the cutting edges 12G are wider than the cutting insert at the body portion 12E (also including the widest portions thereof, i.e. the side seating surfaces 12H). Each cutting edge 12G comprises a rake surface 12I formed in the insert peripheral surface 12C and over which chips (not shown) from a cut workpiece (not shown) can flow, and also comprises a relief surface 12J configured to provide relief during a cutting operation. Each rake surface 12I can lie in a plane perpendicular to the insert first and second sides 12A, 12B. Each rake surface 12I can be formed with a chip-control arrangement (e.g. comprising a recess). Between adjacent cutting portions 12F, the insert peripheral surface 12C, can comprise straight insert peripheral surfaces 12K for mounting the cutting insert 12 to the basic body 14.

Referring to FIGS. 1A to 2, the basic body 14 can have an elongate shape. The basic body 14 comprises front and rear body ends 22A, 22B and a body periphery 22C extending therebetween.

The basic body 14 can comprise a body shank portion 24 and a body head portion 26, which can be integrally formed together to have one-piece unitary construction.

For a four sided body shank portion 24, the body periphery 22C at the body shank portion 24 can comprise first, second, third and fourth body shank side surfaces 24A, 24B, 24C, 24D. A first body shank width $D_{BS1}$, which is a smallest dimension of the body shank portion 24, and in this example can be measured between the first and third body shank side surfaces 24A, 24C, can have a magnitude of less than half of a second body shank width $D_{BS2}$, which is the largest dimension of the body shank portion 24, and in this example can be measured between the second and fourth body shank side surfaces 24B, 24D. The first body shank width $D_{BS1}$ can be parallel to the width axis $A_W$. The second body shank width $D_{BS2}$ can be perpendicular to the width axis $A_W$.

It will be understood that the subject matter of the present application can allow a relatively compact design. Accordingly, explanations of dimensions such as those mentioned in the previous paragraph or below are essentially directed to smaller and larger dimensions for exemplifying such compactness, and hence specific reference to four sides, or a particular side of the four sides does not exclude possible embodiments with a different number of sides, which should be understood accordingly mutatis mutandis.

For a four-sided body head portion 26, the body periphery 22C at body head portion 26 can comprise first, second, third and fourth body head side surfaces 26A, 26B, 26C, 26D. A first body head width $D_{BH1}$, which is a smallest dimension of the head portion 26, and in this example can be measured between the first and third body head side surfaces 26A, 26C, can have a magnitude of less than half of a second body head width $D_{BH2}$, which is a largest dimension of the body head portion 26, and in this example can be measured between the second and fourth body head side surfaces 26B, 26D. The first body head width $D_{BH1}$ can be parallel to the width axis $A_W$. The second body head width $D_{BH2}$ can be perpendicular to the width axis $A_W$.

An actuator bore 28 (FIG. 2) is formed in the basic body 14. More precisely, the actuator bore 28 can be formed in the body head portion 26. Even more precisely, the actuator bore 28 can open out to one or both sides of the body head portion 26, the one or both sides being oriented transverse or perpendicular to the smallest associated basic body 14 dimension (for example, as shown, the actuator bore 28 opens out to the first and third body head side surfaces 26A, 26C which are perpendicular to the first body head width $D_{BH1}$). The actuator bore 28 can extend parallel with the smallest dimension of the portion of the basic body 14 within which it is located (e.g., parallel with the width axis $A_W$). The actuator bore 28 can be formed with internal threading 30.

At the front body end 22A, the body head portion 26 further comprises a front body surface 32 (FIG. 2). At least a portion of the front body surface 32 can be concavely shaped.

A clamp bore 34 can open out to the front body surface 32. The clamp bore 34 can also open out to the first body head side surface 26A. The clamp bore 34 can extend parallel to a clamping axis $A_C$. The clamp bore 34 can have an elongated shape in a cross section perpendicular to the clamping axis $A_C$ (FIG. 1C). More precisely, the cross section can have a shape corresponding to the clamp 16 (or more precisely the clamp shank portion 46 thereof), which in this example can be an oval shape. Regardless of the specific cross-sectional shape, a smallest dimension $D_{CB}$ (FIG. 4A) of the clamp bore 34 can be parallel to the width axis $A_W$ (FIG. 1A). The clamp bore 34 can be free of threading.

The clamping axis $A_C$ (FIG. 1C) can extend perpendicular to the front body surface 32. The clamping axis $A_C$ can be slanted relative to a longitudinally extending longitudinal axis $A_L$ of the basic body.

The basic body 14 and more precisely the body head portion 26 can comprise an insert holding arrangement 36 (FIG. 2). Even more precisely, the insert holding arrangement 36 can extend transversely to the front body surface 32. The insert holding arrangement 36 can be formed at the first body head side surface 26A.

The clamp bore 34 can at least partially open out to the insert holding arrangement 36. The at least partial opening can allow a clamp 16 to be partially or fully retracted into the front body surface 32 when in an engagement position.

In any case, the insert holding arrangement 36 is configured to hold a cutting insert, in this example the cutting insert 12. The insert holding arrangement 36 comprises an insert seating surface 38, at least one lateral projection 40 for preventing lateral motion of the cutting insert 12 along the insert seating surface 38.

The insert seating surface 38 can comprise a first seating sub-surface 38A configured for engaging the cutting insert 12, and a second seating sub-surface 38B which is located between the first seating sub-surface 38A and a seating surface edge 38C and is recessed along the width axis $A_W$ to ensure that the cutting insert 14 contacts the first seating sub-surface 38A for stabilized mounting thereof.

The at least one lateral projection 40 can comprise first, second and third consecutively positioned lateral sub-projections 40A, 40B, 40C. The sub-projections 40A, 40B, 40C are separated by first and second pocket relief recesses 42A, 42B. Notably, the first and third lateral sub-projections 40A, 40C, are positioned to abut the cutting insert's peripheral seating surfaces 12K when the cutting insert 12 is mounted to the insert holding arrangement 36. However, the second lateral sub-projection 40B is configured to be spaced from an associated cutting insert's seating surface 12K, when the assembly 10 is in an engagement position, for facilitating stabilized mounting, as shown by a gap 44 shown in FIG. 4A.

The clamp 16 is mounted to the clamp bore 34 and is configured to move along the clamping axis $A_C$ between an engagement position (FIG. 4A) in which the clamp 16 abuts or secures the cutting insert 12 to hold it in a mounted position to the basic body 14, and a disengagement position (FIG. 4B) in which the cutting insert 12 is removable from the basic body 14. Alternatively, the engagement position could be called a clamping position.

Figures 3A, 3B:
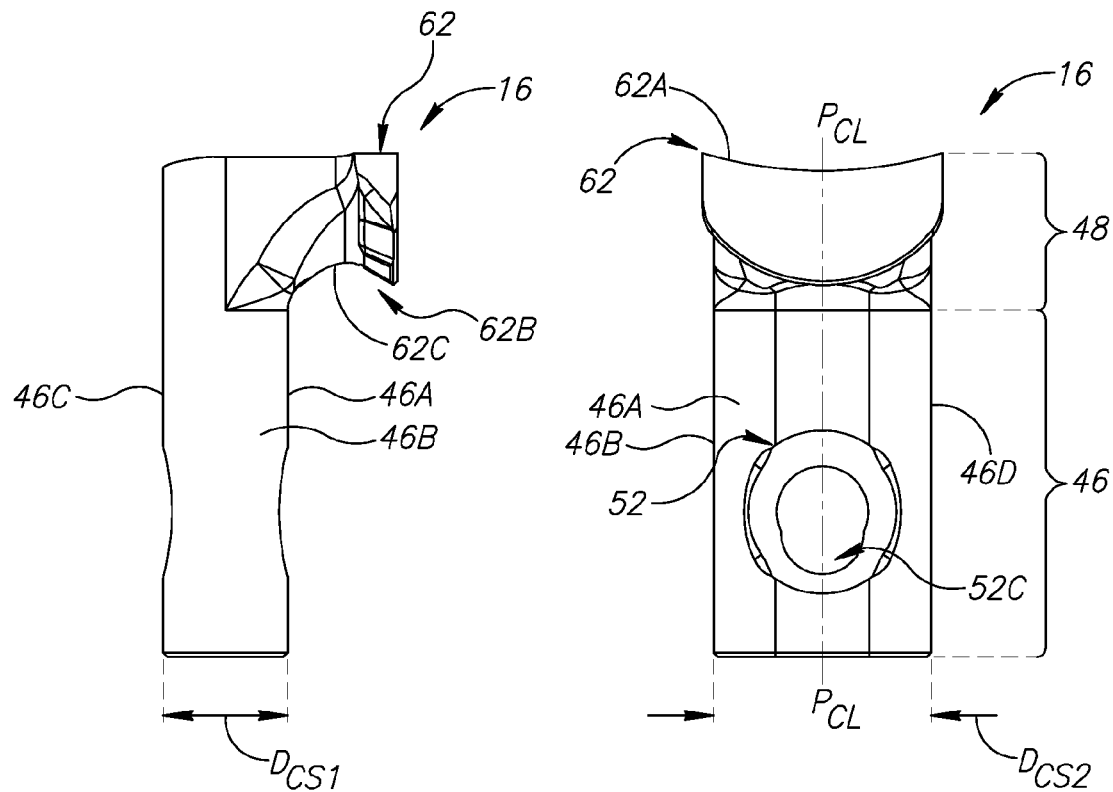
FIG. 3A is a front view of a clamp of the machine tool assembly in FIG. 1.
FIG. 3B is a side view of the clamp in FIG. 3A.
Figure 3C:
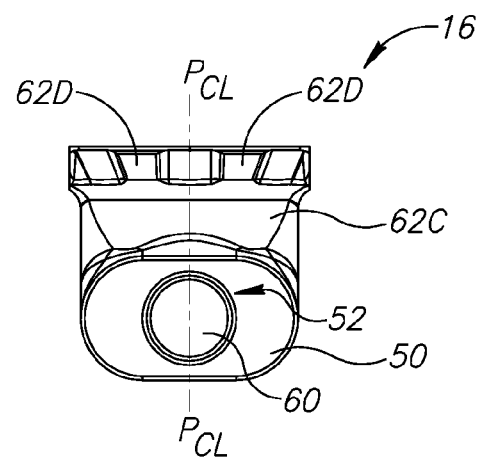
FIG. 3C is a bottom view of the clamp in FIGS. 3A and 3B.

Referring to FIGS. 3A to 3C, the clamp 16 can comprise a clamp shank portion 46 and a clamp head portion 48 extending transversely thereto.

For a four sided clamp shank portion 46, the clamp shank portion 46 can comprise first, second, third and fourth clamp shank side surfaces 46A, 46B, 46C, 46D. The clamp shank portion 46 can be elongated. The clamp shank portion 46 can have an elongated shape in a cross section perpendicular to a longitudinally extending clamp plane $P_{CL}$ (i.e. bisecting the first and third clamp shank side surface 46A, 46C; FIG. 3A). More precisely, the cross section can have an oval shape generally corresponding to the clamp shank bottom surface 50 shown in FIG. 3C. Regardless of the specific cross-sectional shape, a first clamp shank width $D_{CS1}$, which is a smallest dimension of the clamp shank portion 46, and in this example can be measured between the first and third clamp shank side surfaces 46A, 46C, can have a magnitude no greater than about half of a second clamp shank width $D_{CS2}$, which is a largest dimension of the clamp shank portion 46, and in this example can be measured between the second and fourth clamp shank side surfaces 46B, 46D. When the clamp 16 is mounted to the basic body 14, the first clamp shank width $D_{CS1}$ can be parallel to the width axis $A_W$. When the clamp 16 is mounted to the basic body 14, the second clamp shank width $D_{CS2}$ can be perpendicular to the width axis $A_W$.

The clamp 16, and more precisely the clamp shank portion 46 thereof, can be formed with a clamp through-hole 52. The clamp through-hole 52 can open out to the first and third shank side surface 46A, 46C. The clamp through-hole 52 can be symmetrical about the clamp plane $P_{CL}$. Notably, the clamp through-hole 52 can be elongated in a direction parallel with the clamp plane $P_{CL}$ (e.g. in a front view, such as that shown in FIG. 3C). As shown in FIG. 4A the clamp through-hole 52 comprises two generally frustoconically shaped portions 52A, 52B. In addition, the clamp through-hole 52 can be elongated by milling of a recessed portion 52C. The recessed portion 52C is located at a side of the clamp through-hole 50 which is distal to the clamp head portion 48 (i.e. the side closest to the clamp shank bottom surface 50). The recessed portion 52C can allow the clamp 16 to rise an additional distance when in the disengagement position (FIG. 4B) than would be the case if, for example, an inwardly projecting ridge 52D would continue along the entire clamp through-hole 52 (i.e. the actuator component 18 would be engaged with less movement of the clamp 16 along the clamping axis $A_C$).

The recessed portion 52C can comprise a shank stopping surface 54 (FIG. 4A) configured for engagement with the actuator component 18. More precisely, the shank stopping surface 54 can be flat.

Referring to FIG. 5, the clamp 16 can comprise a clamp ramping surface 56. More precisely, the clamp ramping surface 56 can be an internal peripheral surface of the clamp through-hole 52. The clamp ramping surface 56 can have a frustoconical shape. The clamp ramping surface 56 can connect an outer surface 58 of the clamp through-hole 52 and the shank stopping surface 54.

Reverting to FIGS. 3A to 3C, a cylindrical spring recess 60 can be formed in the clamp shank bottom surface 50.

The clamp head portion 48 can project outward past the first shank side surface 46A. In the front view shown in FIG. 3A, a projecting part 62 of the clamp head portion 48 has a crescent shape. Such crescent shape, and in particular a concavely-shaped upper edge 62A thereof, can allow, for some cutting inserts such as the cutting insert 12 shown, depth of cut past the clamping hole 12D (FIG. 2).

A clamping surface 62B located at an underside of the projecting part 62 can comprise a clamping relief surface 62C and clamping teeth 62D.

The clamping relief surface 62C can be configured to be spaced from the cutting insert 12 and the basic body 14 when in an engagement position, so that only the clamping teeth 62D contact the cutting insert 12. More precisely, the clamping relief surface 62C can be concavely-shaped.

The clamping teeth 62D can be symmetrically positioned about the clamp plane $P_{CL}$. Exactly two clamping teeth 62D has been found to be a preferred number for stably clamping the cutting insert 12.

Referring to FIG. 2, the actuator component 18 is configured to be mounted to the basic body 14. More precisely, the actuator component 18 is mounted to the actuator bore 28.

The actuator component 18 can comprise an actuator axis $A_A$, a rear first portion 64 and a front second portion 66 adjacent to the rear first portion 64. More precisely, the rear first portion 64 can be integrally formed with the front second portion 66 to have one-piece unitary construction therewith.

The rear first portion 64 can have a cylindrical shape and can comprise a peripherally located peripheral actuator threading 68 and a coupling arrangement 70. The rear first portion 64 can have a rear end 72r.

The peripheral actuator threading 68 is a male threading configured for engaging the actuator bore's internal threading 30.

The actuator axis $A_A$ can define a front-to-rear direction $D_{ER}$ (FIG. 4B), and an opposite rear-to-front direction $D_{RF}$ (FIG. 4B), of the actuator component 18. The actuator axis $A_A$ can extend through a center of the peripheral actuator threading 68.

The coupling arrangement 70 can be a tool receiving recess.

Referring to FIGS. 4A and 4B, an actuator movement axis $A_M$ coincides with the center of the actuator bore 28. The actuator axis $A_A$ can also extend through the center of the peripheral actuator threading 68 of the actuator component 18. In some embodiments, this allows the actuator movement axis $A_M$ to extend through the center of the entire actuator component 18 (i.e. where the actuator component 18 is symmetrical about the actuator axis $A_A$). The actuator movement axis $A_M$ can also extend through the center of the coupling arrangement 70.

A forward engagement direction $D_E$ can be defined along the actuator movement axis $A_M$ from the rear first portion 64 to the front second portion 66, and a rearward disengagement direction $D_D$ can be an opposite direction to the engagement direction $D_E$.

In embodiments, such as the example shown in the present figures, i.e. where the actuator axis $A_A$ and actuator movement axis $A_M$ are coaxial, the front-to-rear direction $D_{FR}$ is identical to the rearward disengagement direction $D_D$, and the rear-to-front direction $D_{RF}$ is identical to the forward engagement direction $D_E$. Accordingly, such directions ($D_{FR}$, $D_{RF}$, $D_D$, $D_E$) and axes ($A_A$, $A_M$) can be interchangeable.

Also referring to FIGS. 2 and 5, the front second portion 66 comprises an actuator relief surface 72 and an actuator ramping surface 74 adjacent to the actuator relief surface 72, and can comprise an actuator stopper 76. More precisely, the actuator ramping surface 74 can extend between the peripheral actuator threading 68 and the actuator relief surface 72, and the actuator relief surface 72 can be connected on another side thereof to the actuator stopper 76. The front second portion 66 can comprise a front end 72*f*.

According to some embodiments, the front second portion 66 can be generally frustoconically shaped, as shown. More precisely, since the actuator relief surface 72 and actuator ramping surface 74 extend at different angles, forming a discontinuity 78 at the connection area thereof, each surface 72, 74 can be considered to have a frustoconical shape. In embodiments in which the front second portion 66 comprises an actuator stopper 76, the front second portion 66 can have a generally frustoconical shape (or two sub-frustoconical shapes as explained) excluding the actuator stopper 76 (which can preferably be cylindrically shaped).

The actuator relief surface 72 is slanted relative to the disengagement direction $D_D$ to form an acute internal relief angle $\alpha$ with the actuator movement axis $A_M$. It will be understood that the actuator relief surface 72 could alternatively be defined as being slanted relative to the front-to-rear direction $D_{FR}$ to form an acute internal relief angle $\alpha$ with the actuator axis $A_A$. In either case, the internal relief angle $\alpha$ can be, for example, about 70°.

The actuator ramping surface 74 is slanted relative to the disengagement direction $D_D$ to form an acute internal engagement angle $\beta$ with the actuator movement axis $A_M$, angle $\beta$ being smaller than the relief angle $\alpha$. The internal engagement angle $\beta$ can be, for example, about 30°. Similarly, it will be understood that the actuator ramping surface 74 could alternatively be defined as being slanted relative to the front-to-rear direction $D_{FR}$ to form angle $\beta$ with the actuator axis $A_A$.

The actuator ramping surface 74 can have, for example, a length of at least 0.5 mm to allow stable engagement of the clamp 16 and the actuator component 18.

The actuator stopper 76 can have a generally cylindrical shape, and can extend parallel to the actuator movement axis $A_M$. More precisely, the actuator stopper 76 can comprise a stopper cylindrical surface 76A and a stopper end surface 76B.

The actuator stopper 76 can have an actuator stopper length $L_S$ parallel to the actuator movement axis $A_M$. The actuator threading 68 can have an actuator threading length $L_A$ (FIG. 4A) parallel with the actuator movement axis $A_M$. The actuator stopper length $L_S$ can be equal to or less than the actuator threading length $L_A$. Such ratio can, during removal of the actuator component 18 from the assembly 10, assist in avoiding undesired forces on the actuator component 18.

In embodiments where the assembly 10 is biased, for example by the spring 20, it will be normally biased to the disengagement position shown in FIG. 4B. Accordingly, the spring 20 can be a compression spring.

In operation, the actuator component 18 is mounted in the actuator bore 28 and rotated, for example by a tool such as a screw driver etc. (not shown), in a first direction (not shown, e.g. clockwise). The internal threading 30 and peripheral actuator threading 68 cooperate to move the actuator component 18 along the actuator movement axis $A_M$ in the engagement direction $D_E$. During rotation the following sequence of events takes place:

Initially, the actuator component 18 reaches the position shown in FIGS. 4B and 5.

Then, the actuator relief surface 72 abuts the clamp ramping surface 56, thereby moving the clamp 16 along the clamping axis $A_C$ in a securing direction $D_S$ (FIG. 4A). Movement of the clamp 16 reduces a gap 80 (FIG. 4B) between the clamping teeth 62D abut the clamping hole 12D.

Movement of the clamp 16 also brings the clamp ramping surface 56 and actuator ramping surface 74 are brought closer to each other until the discontinuity 78 abuts the clamp ramping surface 56 (and the actuator relief surface 72 no longer contacts the clamp ramping surface 56).

Then, the actuator ramping surface 74 abuts the clamp ramping surface 56. And eventually, the clamp 16 is brought to the engagement position shown in FIG. 4A (i.e. with the clamp ramping surface 56 and correspondingly shaped actuator ramping surface 74 engaged).

In the engagement position, the clamping teeth 62D abut the clamping hole 12D, thereby holding the cutting insert 12 to the basic body 14 (in this example with the cutting insert 12 abutting the first and third lateral sub-projections 40A, 40C of the basic body 14).

It is noted that a suitable slanted construction of the actuator relief surface 72 is required to move the clamp 16 along the clamping axis $A_C$.

To replace or index the cutting insert 12, the actuator component 18 is rotated in a second direction opposite to the first direction. The actuator component 18 moves along the actuator movement axis $A_M$ in the disengagement direction $D_D$ with events opposite to the above description occurring.

Additionally, during rotation in the second direction, after the discontinuity 78 is moved out of contact with the clamp ramping surface 56 (i.e. to a disengagement position), the clamp 16 is immediately moveable to the position shown in FIGS. 4B and 5. In this example, where a biasing element is used, i.e. the spring 20, the clamp 16 is automatically moved to a furthermost position needed to index/replace the cutting insert 12. Engagement of the shank stopping surface 54 and stopper cylindrical surface 76A assists in preventing the clamp 16 from falling from the assembly 10. It will be understood that the stopper cylindrical surface 76A being parallel with the actuator movement axis $A_M$, can increase stability during engagement.

It will be understood that, in the disengagement position, even if an assembly according to the subject matter of the present application would not comprise a biasing means, such as the spring 20 which automatically spaces the clamping surface 62B and insert holding arrangement 36 apart from each other, it would still be possible for an operator to freely move the clamp along the clamping axis $A_C$ and subsequently, for example, index the cutting insert 12.

The description above includes an exemplary embodiment and details, and does not exclude non-exemplified embodiments from the claim scope of the present application.

What is claimed is:

1. A machine tool assembly comprising:
   a basic body having a clamping axis and an actuator movement axis, and comprising an insert holding arrangement, the actuator movement axis defining a forward engagement direction and a rearward disengagement direction;
   a clamp mounted to the basic body, configured to move along the clamping axis relative to the basic body, and comprising a clamp ramping surface and a clamping surface; and
   an actuator component mounted to the basic body and configured to move along the actuator movement axis; the actuator component comprising
   a rear first portion and
   a front second portion;
   the front second portion being closer than the rear first portion to the clamp ramping surface and comprising:
   an actuator relief surface which is outwardly slanted relative to the rearward disengagement direction to thereby form an acute internal relief angle $\alpha$ with the actuator movement axis; and an actuator ramping surface connected at a discontinuity to the actuator relief surface and outwardly slanted relative to the rearward disengagement direction to thereby form an acute internal ramping angle $\beta$ with the actuator movement axis, the ramping angle $\beta$ being smaller than the relief angle $\alpha$;
   wherein the machine tool assembly is adjustable between:
   an engagement position in which the actuator ramping surface abuts the clamp ramping surface, thereby biasing the clamp's clamping surface towards the insert holding arrangement; and
   a disengagement position in which the actuator relief surface is located closer than the actuator ramping surface to the clamp ramping surface.

2. The assembly according to claim 1, further comprising a spring configured to bias the clamp to the disengagement position.

3. The assembly according to claim 1, wherein the clamp is formed with a clamp through-hole and the clamp ramping surface is an internal peripheral surface of the clamp through-hole.

4. The assembly according to claim 1, wherein the basic body is formed with a threaded actuator bore on both sides of the clamp, the actuator bore being configured to receive the actuator component on either side of the clamp.

5. The assembly according to claim 1, wherein the actuator relief surface and/or actuator ramping surface are frustoconically shaped.

6. The assembly according to claim 1, wherein the actuator component further comprises an actuator stopper located, in the forward engagement direction, further along the actuator movement axis than the actuator relief surface.

7. The assembly according to claim 6, wherein the actuator stopper has a generally cylindrical shape.

8. The assembly according to claim 6, wherein the actuator stopper extends parallel to the actuator movement axis.

9. The assembly according to claim 6, wherein the actuator stopper has an actuator stopper length parallel to the actuator movement axis, and an actuator threading has an actuator threading length parallel with the actuator movement axis, and the actuator stopper length is equal to or less than the actuator threading length.

10. The assembly according to claim 1, wherein $\alpha \leq 82°$.

11. The assembly according to claim 1, wherein $5° \leq \beta \leq (\alpha - 5°)$.

12. The assembly according to claim 1, wherein in the disengagement position the clamping surface and insert holding arrangement are either spaced further apart from each other or are free to be spaced further apart from each other, than in the engagement position.

13. An actuator component having an actuator axis defining a front-to-rear direction, and comprising:
   a rear first portion comprising
   a peripheral actuator threading configured to move the actuator component in the front-to-rear direction, and
   a coupling arrangement for rotating the actuator component thereby; and
   a front second portion comprising:
   an actuator relief surface which is outwardly slanted relative to the front-to-rear direction to thereby form an acute internal relief angle $\alpha$ with the actuator axis, and fulfilling the condition $\alpha \leq 82°$; and
   an actuator ramping surface
   located closer to the rear first portion than the actuator relief surface, connected at a discontinuity to the actuator relief surface, and
   outwardly slanted relative to the rearward disengagement direction to thereby form an acute internal ramping angle $\beta$ with the actuator axis,
   the second acute internal ramping angle $\beta$ being smaller than the first internal relief angle $\alpha$ and fulfilling the condition $5° \leq \beta \leq (\alpha - 5°)$.

14. The actuator component according to claim 13, wherein the actuator relief surface and/or actuator ramping surface are frustoconically shaped.

15. The actuator component according to claim 13, wherein the front second portion further comprises an actuator stopper, the actuator stopper being arranged along the actuator axis closer to the actuator relief surface than to the actuator ramping surface.

16. The actuator component according to claim 15, wherein the actuator stopper has a generally cylindrical shape.

17. The actuator component according to claim 15, wherein the actuator stopper has an actuator stopper length parallel to the actuator axis, and the actuator threading has an actuator threading length parallel with the actuator axis, and the actuator stopper length is equal to or less than the actuator threading length.

18. The actuator component according to claim 13, wherein the coupling arrangement is a tool receiving recess.

19. The actuator component according to claim 13, wherein the rear first portion has a cylindrical shape.

20. The actuator component according to claim 13, wherein the rear first portion is integrally formed with the front second portion to have one-piece unitary construction therewith.

* * * * *